Feb. 21, 1933.  L. H. POWELL  1,898,852
COMBINED COTTON CULTIVATOR
Filed April 4, 1931   3 Sheets-Sheet 3
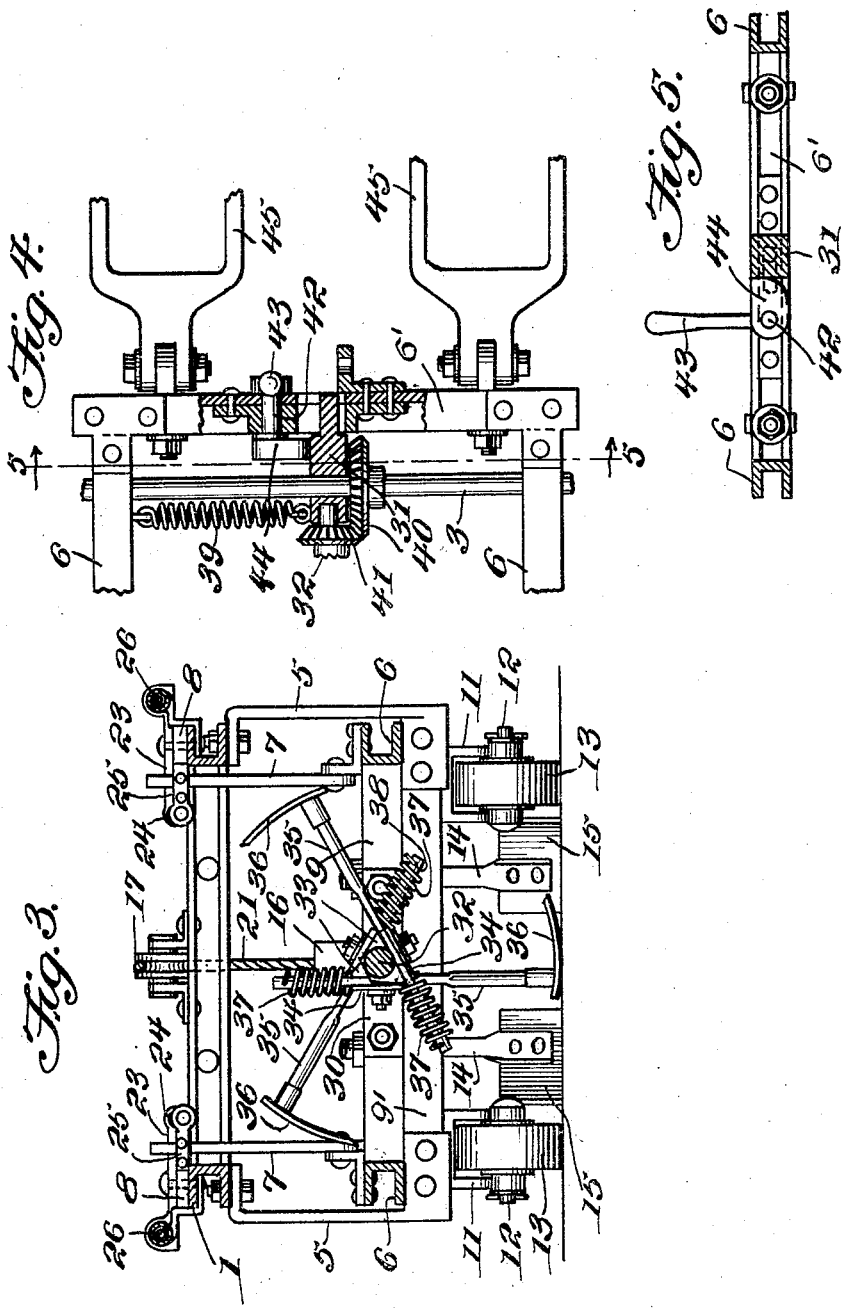

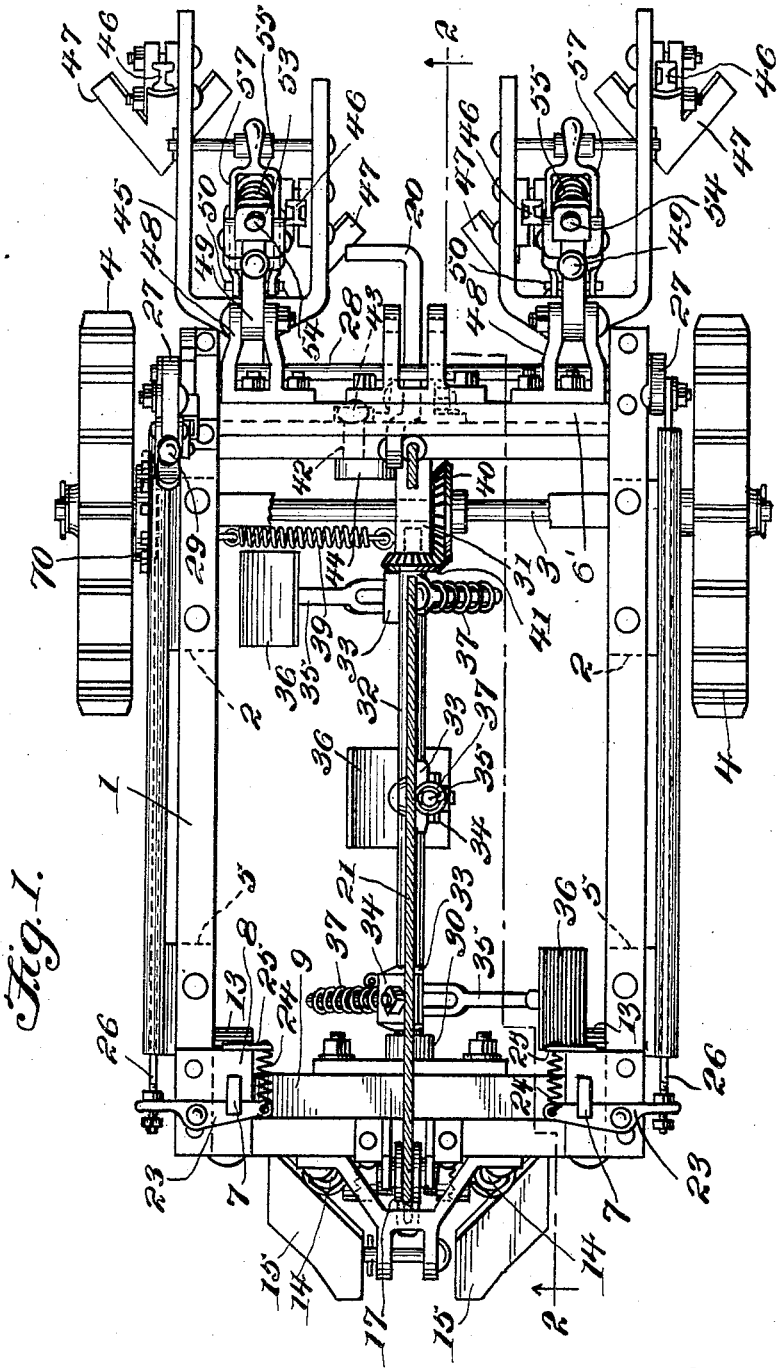

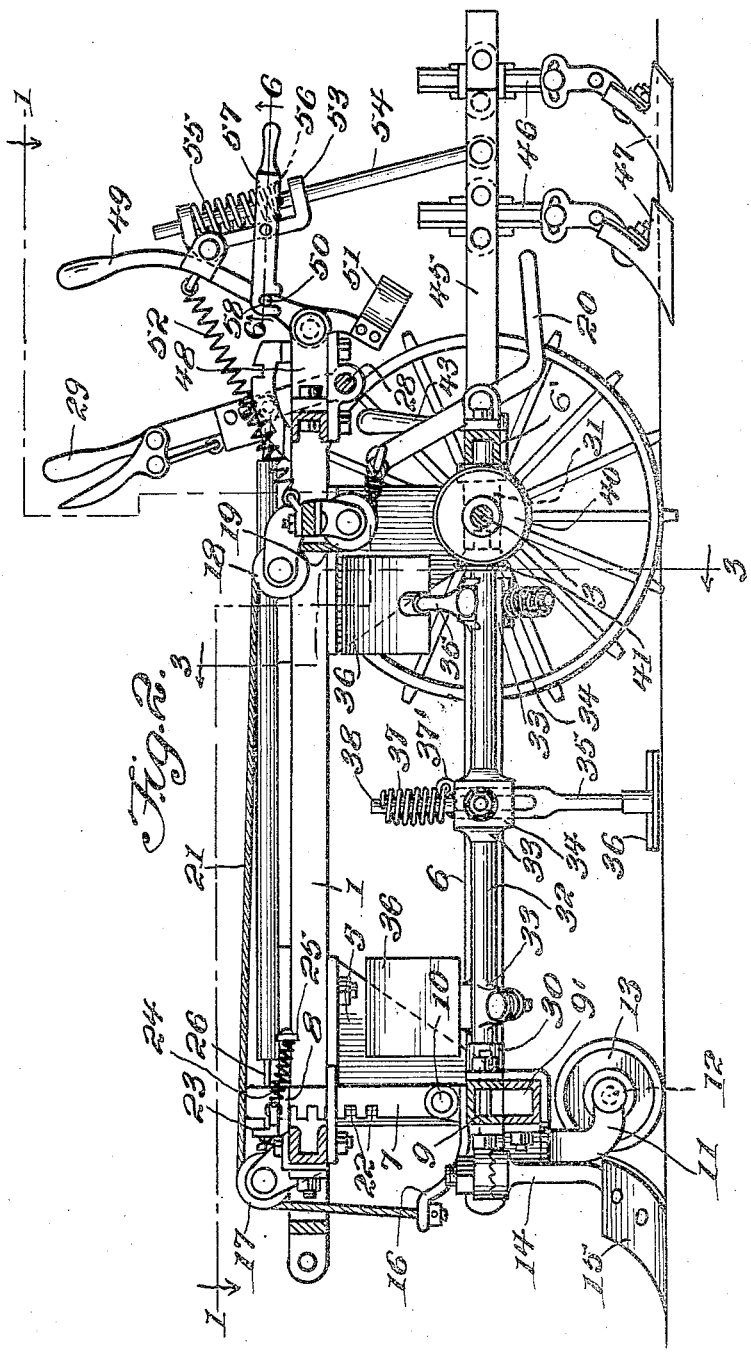

Patented Feb. 21, 1933

1,898,852

UNITED STATES PATENT OFFICE

LESLIE HARRY POWELL, OF BLUEJACKET, OKLAHOMA

COMBINED COTTON CULTIVATOR

Application filed April 4, 1931. Serial No. 527,761.

This invention relates to a combined cotton cultivator and it consists in the novel features hereinafter described and claimed.

An object of the invention is to provide a combined machine of the character stated which includes in the combination means for cutting stalks, means for lifting the soil, a pulverizing means, means for fertilizing the soil, means for planting the seed, means for chopping out standing plants and means for cultivating the growing crop.

In the accompanying drawings:—

Figure 1 is a top plan view of the machine used as a cotton chopper.

Figure 2 is a longitudinal sectional view of the machine cut on the line 2—2 of Figure 1.

Figure 3 is a transverse sectional view cut on the line 3—3 of Figure 2.

Figure 4 is a top plan view of the rear end portion of the frame of the machine showing parts thereon in horizontal section.

Figure 5 is a transverse sectional view cut on the line 5—5 of Figure 4.

In the form of the arrangement as shown in Figures 1, 2 and 3 of the drawings the combined cotton cultivator consists of a rectangular frame 1 having standards 2 depending from the rear portion thereof and at the sides thereof. An axle 3 is journaled for rotation at the lower portions of the said standards and bridges the space between the standards. Ground engaging wheels 4 are fixed to the ends of the axle 3 so that the said axle rotates in unison with the said ground wheels as the machine is drawn over the surface of the ground. Guide standards 5 are fixed at the forward portion of the frame 1. Side rails 6 are located between the standards 2 and 5 at the same side of the frame. Supporting standards 7 are mounted for vertical sliding movement at the forward end of the frame 1 and at the corner portions thereof the upper ends of the said supporting standards 7 being received in guide plates 8 which in turn are fixed to a frame 1; the crossbar 9 is pivotally connected as at 10 with the lower ends of standards 7. Yokes 11 are mounted upon the crossbar 9 and shafts 12 of castor wheels 13 are pivoted in the yokes 11. The castor wheels 13 are adapted to travel upon the surface of the ground. Shanks 14 are provided at their lower ends with plates 15 which serve as soil scrapers and the said shanks 14 are provided at their upper ends with intermeshing rosette members by means of which the said shanks are adjustably connected with the crossbar 9. The crossbar 9 is provided with a forwardly disposed arm 16. A pulley 17 is journaled upon the frame 1 and a pulley 18 is journaled upon the said frame in the vicinity of the rear end thereof. A pulley 19 is journaled at a point below the pulley 18 and a lever 20 is fulcrumed at the rear ends of the rails 6. A cable 21 is connected at one end with the upper end of the lever 20 and is trained under the pulley 19, over the pulleys 18 and 17 and is connected at its forward end with the arm 16. It will be seen that by depressing the rear end of the lever 20 the cable 21 is moved longitudinally whereby the arm 16 and the crossbar 9 are swung and the plates 15 may be lifted above the surface of the soil so that the castor wheels 13 will travel upon the surface of the soil. Thus means are provided for raising and lowering the plates with relation to the surface of the soil.

The cross bar 9 is connected at its ends with the forward ends of the side rails 6 and the rear ends of the side rails 6 are connected together by a cross bar 6'. The side rails 6 are pivoted upon the axle 3 and may swing thereon so that their forward ends move between the standards 5. As the cross bar 9 swings in an upward direction, the cross bar 6' swings in a downward direction and vice versa.

The supporting standards 7 are provided at their forward ends with notches 22 which are adapted to receive the rear edges of the locking bars 23. Springs 24 are connected with the inner ends of the locking bars 23 and are connected with lugs 25 mounted upon the guide plates 8. Rods 26 are connected at their forward ends with the outer ends of the locking bars 23 and the rear ends of the rods 26 are pivoted to arms 27 mounted upon a shaft 28 which is journaled at the rear portion of the frame 1. The end of one of the arms 27 is extended in the form of a handle 29 and by swinging the said handle the shaft 28 is turned whereby the rods 26 are moved longitudinally and the locking bars 23 may be moved into or out of notches 22 at the forward edges of the standards 7. When the locking bars are moved out of the said notches the standards may move longitudinally in the guide plates and thus means are provided for raising or lowering the forward portion of frame 1 with relation to the surface of the soil. A bearing 30 is fixed to the rear side of the crossbar 9 and a bearing 31 is slidably mounted upon the shaft 3. A shaft 32 is journaled in the bearings 30 and 31 and extends along the median length of the frame 1. Blocks 33 are mounted at intervals upon the shaft 32 and include clamp members 34; arms 35 are held upon the block 33 by means of the clamp members 34 and chopping blades 36 are carried at the outer ends of the arms 35. Coiled springs surround the inner ends of the arms 35 and are interposed between the blocks 33 and stop members 38 mounted upon the said arms. A spring 39 is connected at one end with the block 31 and at its other end with one of the side rails 6. A gear wheel 40 is fixed to the axle 3 and a gear wheel 41 is fixed to the rear end of the shafts 32. Under normal conditions the spring 24 holds the block 33 and the gear wheel 41 away from the gear wheel 40. A shaft 42 is journaled behind the axle 3 and is provided at one end with a handle 43 and at its other end with a cam 44. By using the handle 43 the shaft 42 may be turned whereby the end of the cam 44 bears against the side of the block 33 and carries the wheel 41 into mesh with the piece of the wheel 40. Thus as the axle 3 rotates with the ground wheels 4 rotary movement is transmitted through the intermeshing gear wheels 40 and 41 to the shaft 32 and the blades 36 are carried around the said shaft 32 and chop out the plants which are standing in the row. Plow beams 45 are pivotally connected at their forward ends with the rear end of the frame and carry standards 46 provided with plow points 47. Yokes 48 are fixed to the rear end of the frame 1 and levers 49 are pivoted to the yokes 48. The levers 49 are provided at their sides with studs 50 and at their lower ends with clip members 51. Springs 52 are connected at their rear ends with the upper portions of the lever 49 and at their forward ends with the frame 1. Yokes 53 are pivoted upon the levers 49 and rods 54 are slidably received in the said yokes. The lower ends of the rods 54 are pivotally connected with the beams 45. Springs 55 bear at one end against one end of the levers 54 and at their other ends against stop members 56 mounted upon the rods 54. Bars 57 are pivoted at the sides of the yokes 53 and are provided at their free ends with recesses 58 adapted to receive the stud 50.

The block 31 is pivoted upon the axle and inasmuch as the rear end of the shaft 32 is journaled in the block 31 and the forward end of said shaft is journaled in the bearing 30 attached to the cross bar 9, the shaft 32 is always in proper alignment between the side rails 6.

When the parts are in the position as shown in Figure 2 of the drawings the bar 57 holds the rear ends of the beams 45 at a lowered position. When the bar 57 is swung to the position as shown in Figure 11 the springs 52 contract and the rear ends of the beams are elevated and the lower portion of the rods 54 are received between the clips 51. Thus the rear ends of the beams are held at a position so that the soil engaging elements carried thereby are elevated above the surface of the ground.

Having described the invention what is claimed is:—

1. A combined cotton cultivator comprising a rectangular frame, standards depending from the rear portion thereof, an axle journaled in the standards and having ground engaging wheels, supporting standards depending from the forward portion of the frame and adjustable transversely thereof, a crossbar carried by the last mentioned standards, means for raising and lowering the crossbar and the last mentioned standards, ground engaging elements carried by the crossbar and a shaft journaled at one end with relation to the axle and journaled at its opposite ends upon said crossbar and disposed along the median longitudinal dimension of the frame and chopping blades carried by said shaft.

2. A combined cotton cultivator comprising a rectangular frame, standards depending from the rear portion of the frame, an axle journaled in said standards and having ground engaging wheels, supporting standards depending from the forward portion of the frame and adjustable transversely therein, means for locking said supporting standards at an adjusted position, a crossbar carried by the last mentioned standards, ground engaging elements carried by the crossbar and a lever mounted upon the rear portion of the frame and operatively connected with the supporting standard locking devices.

3. A combined cotton cultivator comprising a rectangular frame, ground wheels supporting the rear portion thereof, supporting standards depending from the forward portion of the frame and adjustable transversely thereof, means for locking said standards at an adjusted position, a lever mechanism mounted at the rear portion of the frame and operatively connected with said standard locking means, a crossbar pivotally connected with the lower portion of the standards, and soil engaging devices carried by said crossbar.

4. A combined cotton cultivator comprising a rectangular frame, ground wheels supporting the rear portion thereof, supporting standards depending from the forward portion of the frame and adjustable transversely thereof, means for locking said standards at adjusted position, a lever device mounted at the rear portion of the frame and operatively connected with the locking means, a crossbar pivotally connected with the said standards, ground engaging elements carried by the crossbar, and a lever mechanism pivoted at the rear portion of the frame and operatively connected with the crossbar to swing the same.

5. A combined cotton cultivator comprising a rectangular frame, ground wheels supporting the rear portion thereof, supporting standards depending from the forward portion thereof, and provided at their edges with notches, spring pressed bars pivoted upon the frame and adapted to enter the notches of the standards to hold the same at adjusted position, a lever mechanism mounted at the rear portion of the frame and operatively connected with said locking bars to move the same for releasing the standards, a crossbar pivoted at the lower ends of the standards, castor wheels carried by the crossbar and soil engaging elements carried by the crossbar and located in advance of the castor wheel and a lever mechanism pivoted at the rear portion of the frame and operatively connected with the crossbar to swing the same.

6. In a machine of the character described a wheel supported frame, soil engaging elements carried by the frame, supporting standards adjustably mounted at the forward portion of the frame, means for securing the standards at adjusted position, a crossbar pivoted to the standards, ground engaging elements carried by the crossbar, said crossbar having a forwardly disposed arm, a lever pivoted at the rear portion of the frame and pulleys mounted upon the frame and a flexible element connected at one end with the lever and at its other end with the arm and trained about said pulleys.

In testimony whereof I affix my signature.

LESLIE HARRY POWELL.